(12) United States Patent
Son et al.

(10) Patent No.: US 12,459,507 B2
(45) Date of Patent: Nov. 4, 2025

(54) CONTROL DEVICE, CONTROL METHOD, AND STORAGE MEDIUM

(71) Applicant: DENSO CORPORATION, Kariya (JP)

(72) Inventors: Riten Son, Kariya (JP); Kiyoshi Matsuo, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 18/538,200

(22) Filed: Dec. 13, 2023

(65) Prior Publication Data

US 2024/0123986 A1    Apr. 18, 2024

Related U.S. Application Data

(63) Continuation of application No. PCT/JP2022/020647, filed on May 18, 2022.

(30) Foreign Application Priority Data

Jun. 17, 2021    (JP) ................. 2021-100905

(51) Int. Cl.
*B60Q 1/08*    (2006.01)
*B60W 30/14*    (2006.01)
*B60W 60/00*    (2020.01)

(52) U.S. Cl.
CPC .......... *B60W 30/143* (2013.01); *B60Q 1/085* (2013.01); *B60W 60/0027* (2020.02); *B60Q 2300/33* (2013.01); *B60W 2556/65* (2020.02); *B60W 2756/10* (2020.02)

(58) Field of Classification Search
CPC .......... B60W 30/143; B60W 60/0027; B60W 2556/65; B60W 2756/10; B60Q 1/085; B60Q 2300/33; G01S 7/36; G01S 17/931; G01S 13/931; G08G 1/16

See application file for complete search history.

(56) References Cited

U.S. PATENT DOCUMENTS

| | | | |
|---|---|---|---|
| 10,168,418 | B1 | 1/2019 | Al-Stouhi et al. |
| 2016/0313447 | A1 | 10/2016 | Ishio |
| 2017/0082737 | A1 | 3/2017 | Slobodyanyuk et al. |
| 2018/0128911 | A1 | 5/2018 | Kim |

FOREIGN PATENT DOCUMENTS

| | | | | |
|---|---|---|---|---|
| JP | 2002-156226 A | | 5/2002 | |
| JP | 2008026095 A | * | 7/2006 | ........... G01S 13/931 |
| JP | 2008-275400 A | | 11/2008 | |
| JP | 2018-072078 A | | 5/2018 | |

* cited by examiner

*Primary Examiner* — Brodie J Follman
(74) *Attorney, Agent, or Firm* — Maschoff Brennan

(57) ABSTRACT

A control device includes a processor configured to: acquire irradiation related information related to beam irradiation of a host vehicle and a target vehicle; predict, based on the irradiation related information, an interference scene in which the beam interference occurs between the host vehicle and the target vehicle; perform an interference risk control to the host vehicle to mitigate a risk of beam interference in the predicted interference scene; perform a path change control to the host vehicle to change a future path of the host vehicle to a mitigation path that mitigates the beam interference; perform a beam change control to change a scheduled pattern of beam irradiation in which irradiation timing is set to be intermittent and an irradiation azimuth is set in scan manner to a mitigation pattern that mitigates the beam interference in response to the path change control being determined to be prohibited.

8 Claims, 16 Drawing Sheets

CONTROL DEVICE, CONTROL METHOD, AND STORAGE MEDIUM

CROSS REFERENCE TO RELATED APPLICATIONS

The present application is a continuation application of International Patent Application No. PCT/JP2022/020647 filed on May 18, 2022, which designated the U.S. and claims the benefit of priority from Japanese Patent Application No. 2021-100905 filed on Jun. 17, 2021. The entire disclosures of all of the above applications are incorporated herein by reference.

TECHNICAL FIELD

The present disclosure relates to a control technique for avoiding beam interference of a beam sensor of host vehicle in a beam sensor of target vehicle.

BACKGROUND

Conventionally, it has been proposed to reduce beam interference with a beam sensor mounted on a target vehicle by generating a predetermined pattern in light irradiation from a beam sensor of a host vehicle for distance measurement purpose.

SUMMARY

The present disclosure provides a control device. The control device includes a processor configured to: acquire irradiation related information related to beam irradiation of a host vehicle and a target vehicle; predict, based on the irradiation related information, an interference scene in which the beam interference occurs between the host vehicle and the target vehicle; perform an interference risk control to the host vehicle to mitigate a risk of beam interference in the predicted interference scene; perform a path change control to the host vehicle to change a future path of the host vehicle to a mitigation path that mitigates the beam interference; perform a beam change control to change a scheduled pattern of beam irradiation in which irradiation timing is set to be intermittent and an irradiation azimuth is set in scan manner to a mitigation pattern that mitigates the beam interference in response to the path change control being determined to be prohibited.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
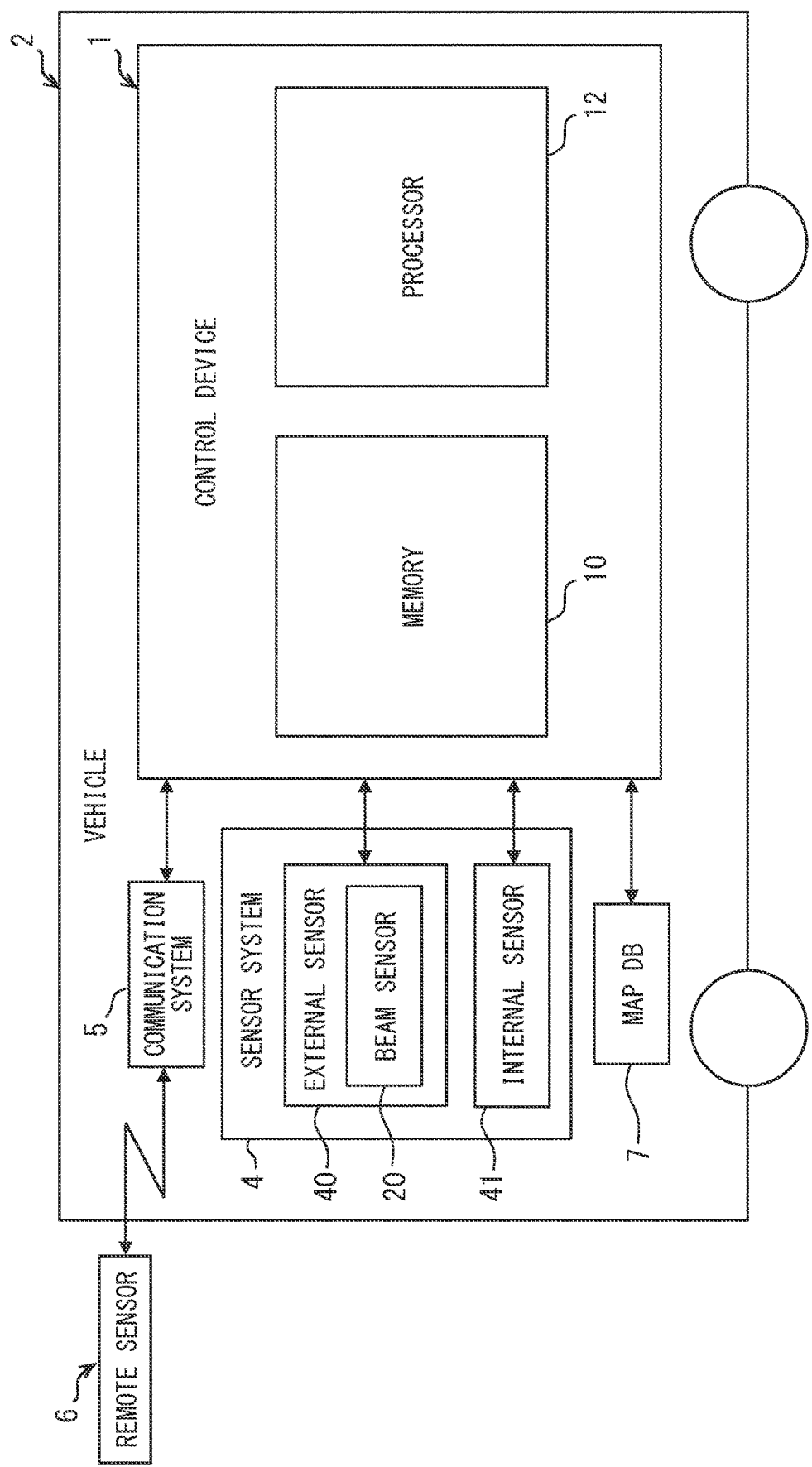
FIG. 1 is a block diagram showing an overall configuration according to a first embodiment.

In a known art related to a beam sensor, a predetermined irradiation pattern is also generated in the measurement light irradiation from a beam sensor mounted on a target vehicle. Since versatility is low in a car society in which various specifications exist for a beam sensor, it is difficult to prevent interference noise caused by beam interference from affecting sensing accuracy in a host vehicle.

According to a first aspect of the present disclosure, a control device, which avoid a beam interference between a beam sensor of a host vehicle and a beam sensor of a target vehicle, includes a processor. The processor: acquires irradiation related information related to beam irradiation of the host vehicle and the target vehicle; predicts, based on the irradiation related information, an interference scene in which the beam interference occurs between the host vehicle and the target vehicle; and performs an interference risk control to the host vehicle to mitigate a risk of beam interference in the predicted interference scene. Performing the interference risk control includes: performing a path change control to the host vehicle to change a future path of the host vehicle to a mitigation path that mitigates the risk of beam interference; and performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

According to a second aspect of the present disclosure, a control method executed by a processor to avoid a beam interference between a beam sensor of a host vehicle and a beam sensor of a target vehicle is provided. The control method includes acquiring irradiation related information related to beam irradiation of the host vehicle and the target vehicle; predicting, based on the irradiation related information, an interference scene in which the beam interference occurs between the host vehicle and the target vehicle; and performing an interference risk control to the host vehicle to mitigate a risk of beam interference in the predicted interference scene. Performing the interference risk control includes: performing a path change control to the host vehicle to change a future path of the host vehicle to a mitigation path that mitigates the risk of beam interference;

and performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

According to a third aspect of the present disclosure, a computer-readable non-transitory storage medium storing a control program is provided. The control program includes instructions to be executed by a processor to avoid a beam interference between a beam sensor of a host vehicle and a beam sensor of a target vehicle. The instructions include: acquiring irradiation related information related to beam irradiation of the host vehicle and the target vehicle; predicting, based on the irradiation related information, an interference scene in which the beam interference occurs between the host vehicle and the target vehicle; and performing an interference risk control to the host vehicle to mitigate a risk of beam interference in the predicted interference scene. Performing the interference risk control includes: performing a path change control to the host vehicle to change a future path of the host vehicle to a mitigation path that mitigates the risk of beam interference; and performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

According to the first to third aspects, an interference scene in which beam interference occurs between the host vehicle and the target vehicle is predicted based on irradiation related information, which is related to beam irradiation between the host vehicle and the target vehicle. Therefore, in the predicted interference scene, by providing the host vehicle with the interference risk control for mitigating the risk of beam interference, beam interference can be avoided in a versatile manner even when the specification of the beam sensor mounted on the host vehicle is different from the specification of the beam sensor mounted on the target vehicle. Therefore, it is possible to ensure high sensing accuracy of the beam sensor in the host vehicle.

The following will describe embodiments of the present disclosure with reference to the drawings. It should be noted that the same reference symbols are assigned to corresponding components in the respective embodiments, and repeated descriptions may be omitted. When only a part of the configuration is described in each embodiment, the configurations of the other embodiments described above can be applied to remaining part of the configuration. Further, not only the combinations of the configurations explicitly shown in the description of the respective embodiments, but also the configurations of the multiple embodiments can be partially combined together even if the configurations are not explicitly described under a condition that there is no difficulty in the combination in particular.

First Embodiment

Figure 2:
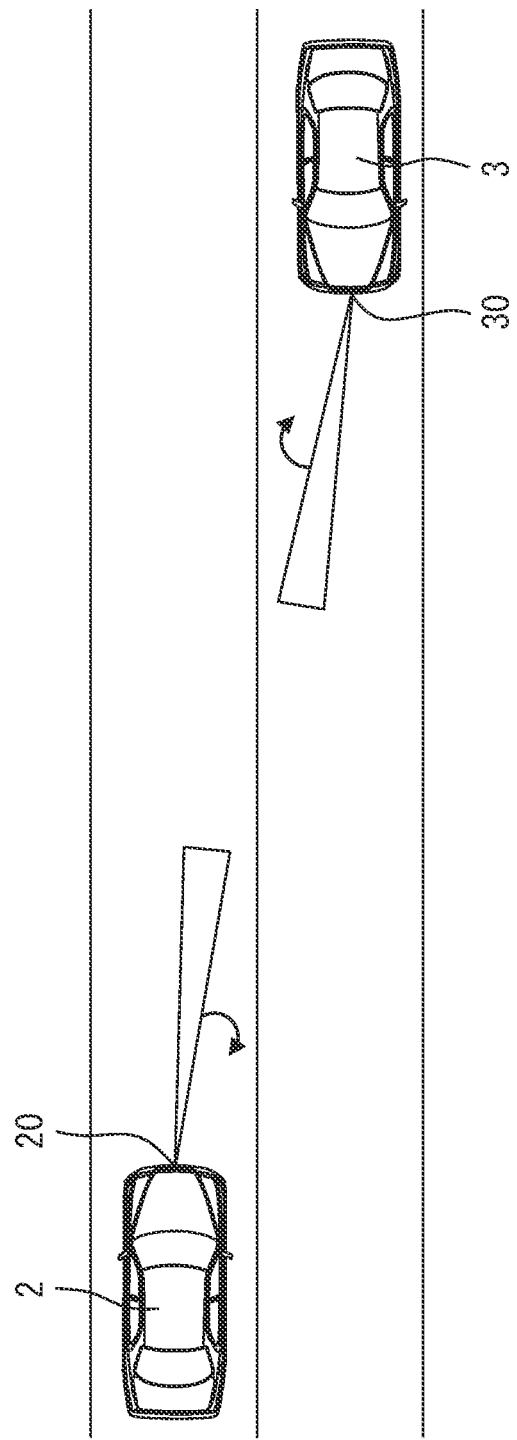
FIG. 2 is a schematic diagram showing a traveling environment of a host vehicle to which the first embodiment is applied.

As shown in FIG. 1, a control device 1 according to the first embodiment is a device for avoiding beam interference between a beam sensor 30 of a target vehicle 3 and a beam sensor 20 of a host vehicle 2 by executing a control in the host vehicle 2. The host vehicle and target vehicle are shown in FIG. 2. From a viewpoint of the host vehicle 2, the host vehicle 2 corresponds to an ego-vehicle. From a viewpoint of the host vehicle 2, the target vehicle 3 corresponds to another road user.

The host vehicle 2 is capable of executing an automated driving mode, which is classified into levels according to the degree of manual intervention of the occupant in the driving task. The automated driving mode may be achieved with an autonomous traveling control, such as conditional driving automation, advanced driving automation, or full driving automation. In the full driving automation, the system in operation state performs all of driving tasks. The automated driving mode may be achieved with an advanced driving assistance control, such as driving assistance or partial driving automation, where an occupant performs partial or all of the driving tasks. The automated driving mode may be achieved with either one or combination of the autonomous traveling control and the advanced driving assistance control. The automated driving mode may also be achieved by switching between the autonomous traveling control and the advanced driving assistance control.

As shown in FIG. 1, the host vehicle 2 of the first embodiment includes a control device 1, a sensor system 4, a communication system 5, and a map database 7. The sensor system 4 acquires sensor information, which is to be used by the control device 1, by detecting an external environment and an internal environment of the host vehicle 2. For this purpose, the sensor system 4 includes an external sensor 40 and an internal sensor 41.

The external sensor 40 acquires external environment information as the sensor information from an external periphery environment of the host vehicle 2. The external sensor 40 may acquire the external environment information by detecting a target existing outside the host vehicle 2. The external sensor 40, which detects an object, may be provided by at least one of a camera, a Light Detection and Ranging/Laser Imaging Detection and Ranging (LiDAR), a radar, a sonar, or the like.

In the first embodiment, at least one beam sensor 20 is mounted on the host vehicle 2 as the external sensor 40. As shown in FIG. 2, the beam sensor 20 emits a beam toward outside of the host vehicle 2 and detects a reflected beam from the outside for target detection purpose. The beam sensor 20 may be a LiDAR that emits laser lights as a beam. The beam sensor 20 may be a millimeter wave radar that emits millimeter waves as a beam.

In the first embodiment, a target for which beam interference is to be avoided may be at least one beam sensor 30 mounted on the target vehicle. The beam sensor 30 of the target vehicle 3 is the same type beam sensor as the beam sensor 20 of the host vehicle 2. The beam sensor 30 of the target vehicle 3 corresponds to one type of external sensor 40 of the target vehicle. For example, with respect to the beam sensor 20 that uses laser light as a beam on host vehicle 2 side, the beam sensor 30 that uses laser light as a beam on the target vehicle 3 side is a target for which the beam interference is to be avoided. With respect to the beam sensor 20 that uses millimeter wave as a beam on the host vehicle 2 side, the beam sensor 30 that uses millimeter wave as a beam on the target vehicle side is a target for which the beam interference is to be avoided. However, in either case, the specifications of the beam sensors 20, 30 including the characteristics of corresponding beams may be different from one another or may be the same as one another.

The internal sensor 41 shown in FIG. 1 acquires, as internal information, sensor information from an internal environment of the host vehicle 2. The internal sensor 41 may acquire the internal information by detecting a specific kinetic physical quantity in the internal environment of the host vehicle 2. The internal sensor 41 that detects the kinetic physical quantity may be at least one of a traveling speed sensor, an acceleration sensor, a gyro sensor, or the like. The internal sensor 41 may acquire the internal environment information by detecting a specific state of an occupant in the internal environment of the host vehicle 2. The internal sensor 41 that detects an occupant may be at least one of a driver status monitor (registered trademark), a biosensor, a seating sensor, an actuator sensor, an in-vehicle equipment sensor, or the like.

The communication system 5 acquires, via wireless communication, communication information that can be used by the control device 1. The communication system 5 includes a vehicle to everything (V2X) type that transmits and receives a communication signal to and from a V2X system located outside the host vehicle 2. The communication system 5 of the V2X type may be at least one of a dedicated short range communications (DSRC) communication device, a cellular V2X (C-V2X) communication device, or the like. The communication system 5 of the V2X type configures a communication network capable of communicating with at least one target vehicle 3 and a remote center 6 located outside the host vehicle 2.

The target vehicle 3 is equipped with a communication system to communicate with the host vehicle 2 and a map database. The remote center 6 mainly includes a server unit, such as a cloud server or an edge server (including an infrastructure computer), a communication unit, and a map database. For example, the remote center 6 is at least one of a management center that monitors and manages driving or operation of the host vehicle 2, a service center that provides a service related to the host vehicle 2, or the like. For example, in the remote center 6, an output control process such as information display to an operator of the remote center 6 may be executed in relation to a road user including the host vehicle 2 that can communicate with the remote center through the communication unit. Accordingly, the remote center 6 may execute an input control process of receiving information to be fed back to the communicable road user from, for example, an operator of the remote center 6.

The communication system 5 may have a positioning function that receives a positioning signal from an artificial satellite of a global navigation satellite system (GNSS) located outside the host vehicle 2. For example, the communication system 5 having the positioning function may be a GNSS receiver or the like. The communication system 5 may have a terminal communication function that can transmit and receive a communication signal to and from a terminal located in the internal environment of the host vehicle 2. For example, the communication system 5 that has terminal communication function may be at least one of a Bluetooth (registered trademark) device, a Wi-Fi (registered trademark) device, an infrared communication device, or the like.

The map database 7 stores map information usable by the control device 1. The map database 7 includes a non-transitory tangible storage medium, which is at least one type of a semiconductor memory, a magnetic medium, an optical medium, or the like. The map database 7 may be a database of a locator that estimate a motion state including the position of the host vehicle 2. The map database 7 may be a database of a navigation unit that guides a travel route of the host vehicle 2. The map database 7 may be configured by a combination of multiple different types of databases.

The map database 7 acquires and stores the latest map information by performing communication with the remote center 6 through the communication system 5 of V2X type. The map information indicates a traveling environment of the host vehicle 2, and may be provided by two or three-dimensional data. Digital data of a high definition map may be adopted as the three-dimensional map data. The map information may include road information indicating at least one of road position, road shape, road surface condition, or the like. The map information may include marking information, which indicates at least one of traffic sign attached to a road, lane mark position, or lane mark shape. The map information may include structure information indicating at least one of building position or building shape along the road, or traffic light position or traffic light shape installed along the road.

The control device 1 is connected to the sensor system 4, the communication system 5, and the map database 7 via at least one of a local area network (LAN) line, a wire harness, an internal bus, or a wireless communication line. The control device 1 includes at least one special purpose computer.

The special purpose computer included in the control device 1 may be a driving control electronic control unit (ECU) that controls driving of the host vehicle 2. The special purpose computer included in the control device 1 may be a navigation ECU that navigates a travel route of the host vehicle 2. The special purpose computer included in the control device 1 may be a locator ECU that estimates a self-state quantity of the host vehicle 2. The special purpose computer included in the control device 1 may be an actuator ECU that controls a travel purpose actuator of the host vehicle 2. The special purpose computer included in the control device 1 may be a human machine interface (HMI) control unit (HCU) that controls information presentation in the host vehicle 2.

The special purpose computer included in the control device 1 may include at least one memory 10 and at least one processor 12. The memory 10 is a non-transitory tangible storage medium, which is at least one type of semiconductor memory, a magnetic medium, and an optical medium, for storing, in non-transitory manner, computer readable programs and data. For example, the processor 12 may include, as a core, at least one of a central processing unit (CPU), a graphics processing unit (GPU), a reduced instruction set computer (RISC) CPU, a data flow processor (DFP), a graph streaming processor (GSP), or the like.

Figure 3:
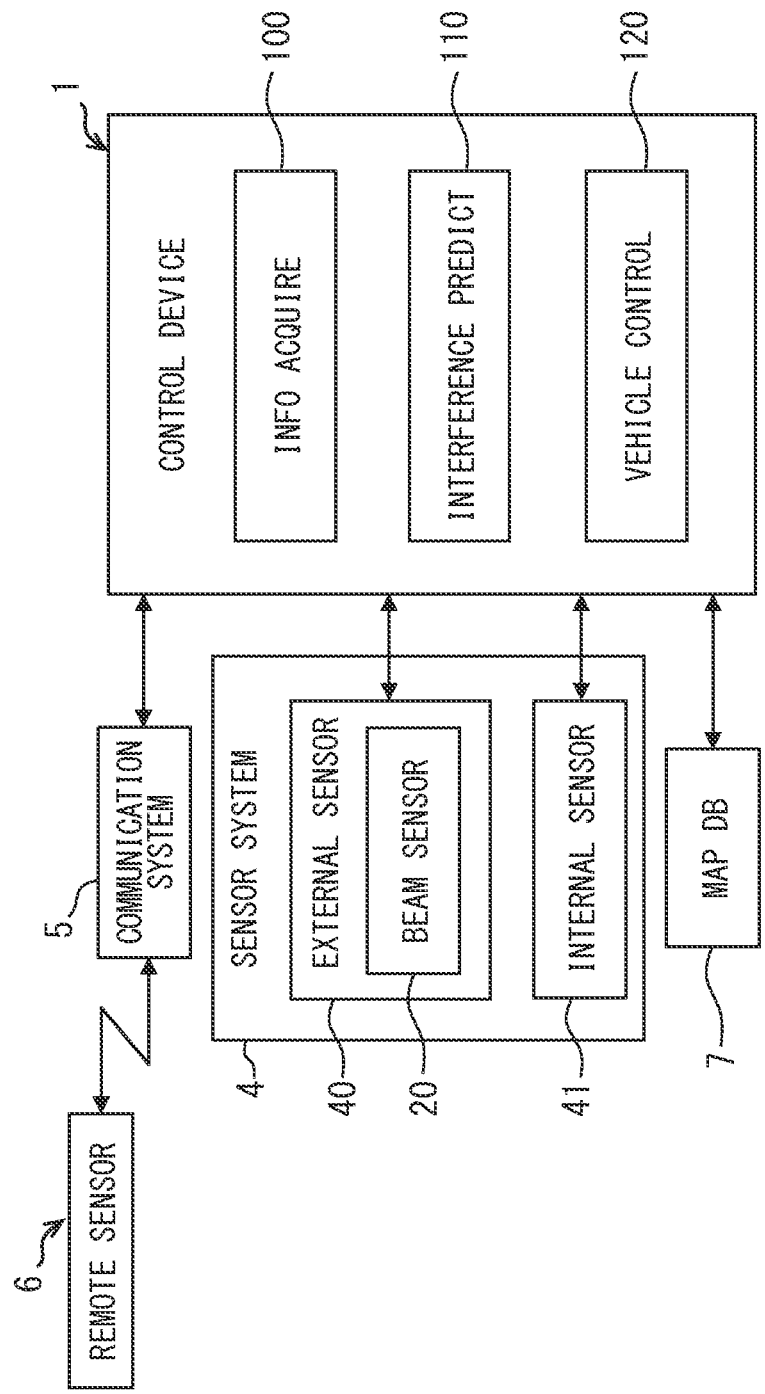
FIG. 3 is a block diagram showing a functional configuration of a control device according to the first embodiment.

In the control device 1, the processor 12 executes multiple instructions included in the control program stored in the memory 10 in order to avoid beam interference of the beam sensor 20 of the host vehicle 2 with the beam sensor 30 of the target vehicle 3. By executing the control program, the control device 1 implements multiple functional blocks in order to avoid beam interference of the beam sensor 20 of the host vehicle 2 with the beam sensor 30 of the target vehicle 3. As shown in FIG. 3, the functional blocks of the control device 1 include an information acquisition block 100, an interference prediction block 110, and a vehicle control block 120.

Figure 4:
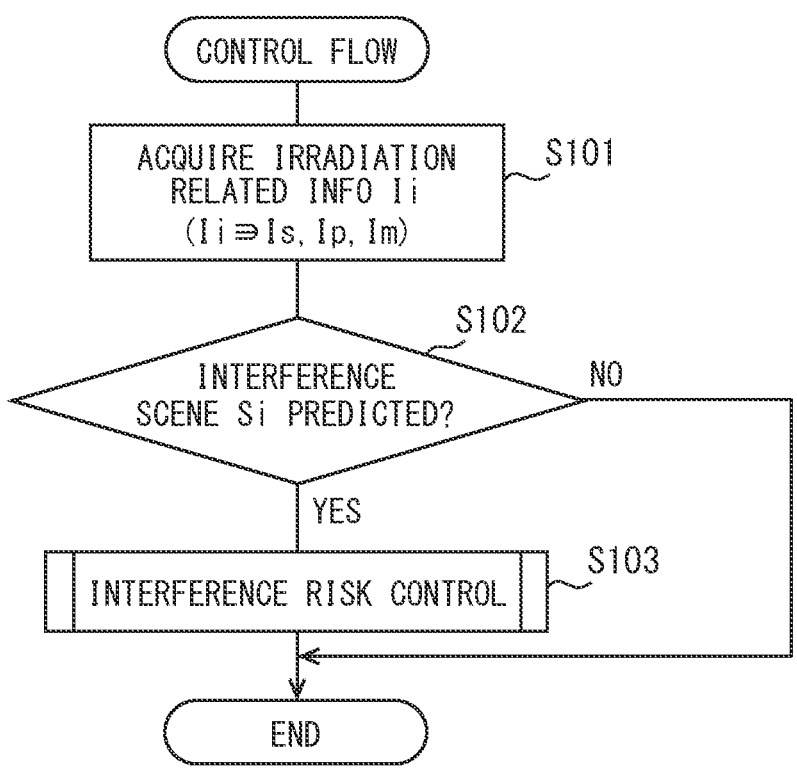
FIG. 4 is a flowchart showing a control method according to the first embodiment.

The control method for avoiding the beam interference between the beam sensor 30 of the target vehicle 3 and the beam sensor 20 of the host vehicle 2 is executed by the control device 1 in cooperation with the functional blocks 100,110,120 according to a control flow shown in FIG. 4. This control flow is repeatedly executed during power on state of the host vehicle 2. Each "S" in the control flow indicates one or more steps executed by one or more instructions included in the control program.

In S101 of the control flow according to the first embodiment, the information acquisition block 100 acquires irradiation related information Ii related to the beam irradiation in each of the host vehicle 2 and the target vehicle 3. At this time, the irradiation related information Ii of the host vehicle 2 is acquired through at least one of the sensor system 4, which includes the beam sensor 20, the communication system 5, and the map database 7. The irradiation related information Ii of the target vehicle 3 is acquired through the communication system of the target vehicle 3.

The irradiation related information Ii of each vehicle 2, 3 included in the irradiation related information Ii acquired by the information acquisition block 100 in S101 includes characteristic information Is of the beam sensor 20 and characteristic information Is of the beam sensor 30. The characteristic information Is of each beam sensor 20, 30 indicates multiple types of sensing parameters. For example, the sensing parameters include a sensing distance, a scheduled pattern of beam irradiation in which the intermittent irradiation timing and irradiation direction for scanning are defined, and a minimum operation duration $\Delta t$ (see FIG. 10 and FIG. 11 to be described later) necessary for changing the scheduled pattern. The scheduled pattern of beam irradiation indicates a temporal transition of the intermittent irradiation timing of the beam irradiation and the irradiation direction from the present time to a future time. The minimum operation duration $\Delta t$ is defined as, for example, a duration from a start time of beam change control (described in detail later) for changing the scheduled pattern to a time at which the beam sensor 20, 30 starts the operation change or to a time at which the beam sensor 20, 30 is stabilized after the operation change.

The irradiation related information Ii of each vehicle 2, 3 acquired by the information acquisition block 100 in S101 includes path information Ip. The path information Ip of each vehicle 2, 3 represents multiple types of path plan data including, for example, a planned future path Pf (see FIG. 9 described later), a speed profile and an acceleration profile on the future path Pf, and an arrival time at a key point on the future path. The future path Pf indicates a planned route of the host vehicle 2, and particularly in the first embodiment, includes at least one of a route or a trajectory, which is planned from the present time to a future time.

The irradiation related information Ii acquired by the information acquisition block 100 in S101 includes at least the map information Im stored in the map database 7 of the former of the host vehicle 2 and the target vehicle 3. The map information Im is acquired so as to associate a position for each control timing (that is, the control time) from the present time to the future time with the characteristic information Is and the path information Ip of each vehicle 2, 3.

Figure 5:
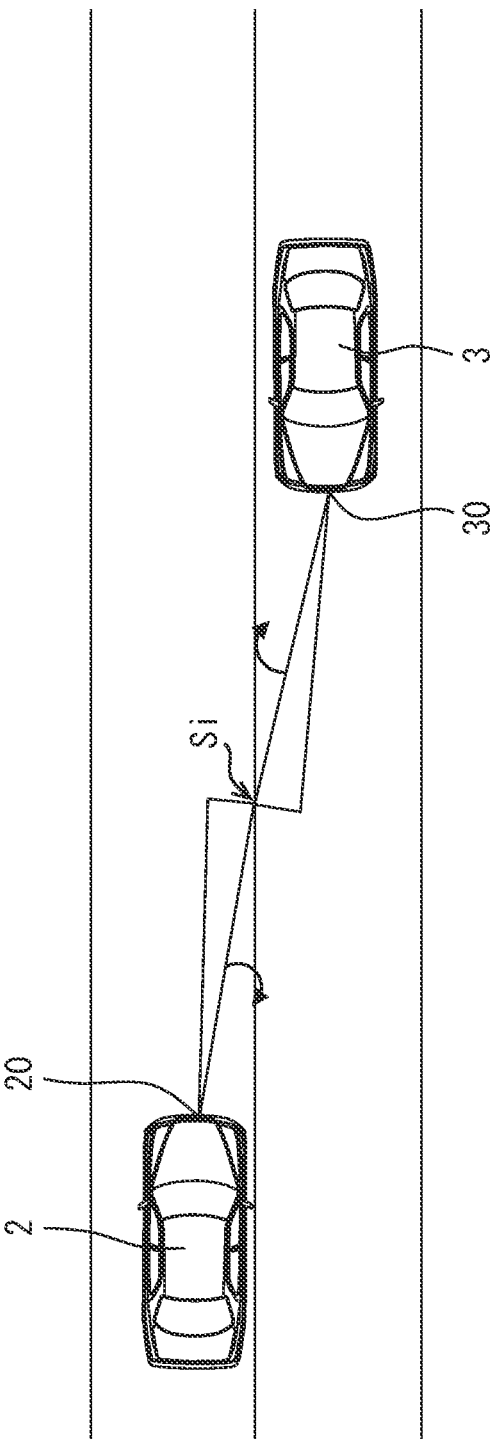
FIG. 5 is a schematic diagram showing an interference scene according to the first embodiment.
Figure 6:
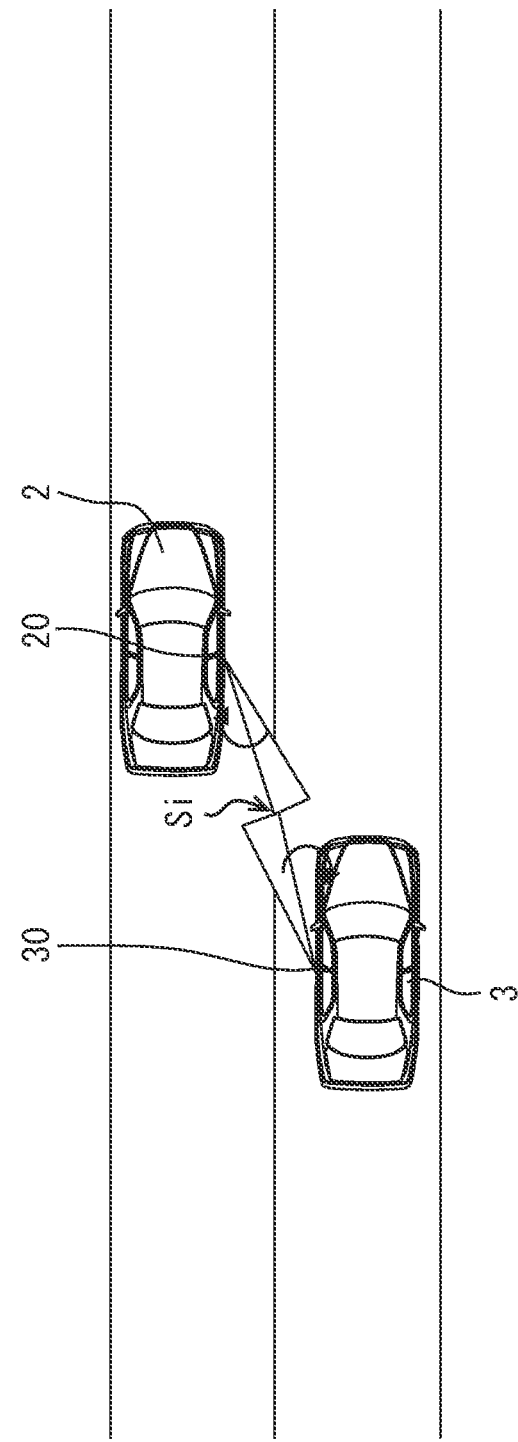
FIG. 6 is a schematic diagram showing an interference scene according to the first embodiment.
Figure 7:
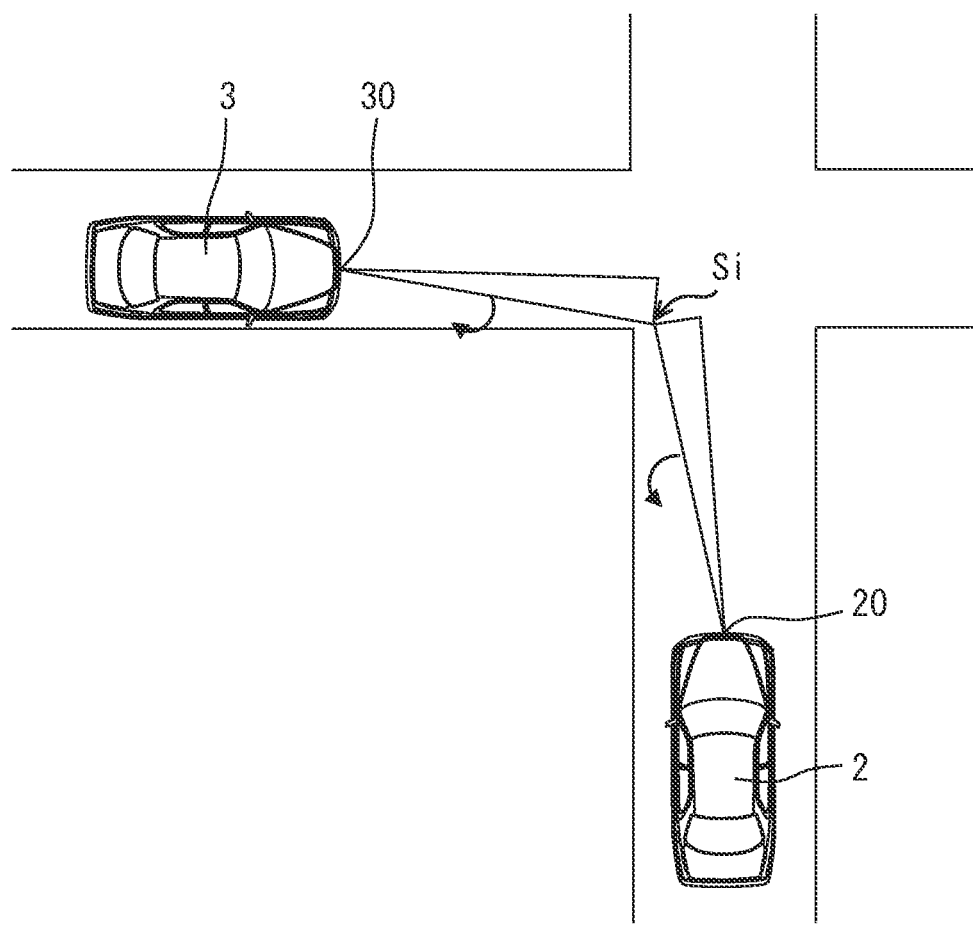
FIG. 7 is a schematic diagram showing an interference scene according to the first embodiment.

In S102 of the control flow, the interference prediction block 110 predicts an interference scene Si in which beam interference occurs between the host vehicle 2 and the target vehicle 3 as illustrated in FIG. 5 to FIG. 7, based on the irradiation related information Ii acquired by the information acquisition block 100 in S101. At this time, the interference scene Si is defined as a future scene in which, on the future path Pf of each of the host vehicle 2 and the target vehicle 3, a separation distance between the host vehicle 2 and the target vehicle 3 is equal to or less than a sum of sensing distances of the beam sensors 20, 30, and the irradiation directions of the beam sensors 20, 30 become intersecting directions or opposite directions at an identical time point. In the prediction of interference scene Si, a start time Ti of the interference scene Si (see FIG. 10 and FIG. 11 described later) and time transition of the interference scene Si are estimated.

Figure 9:
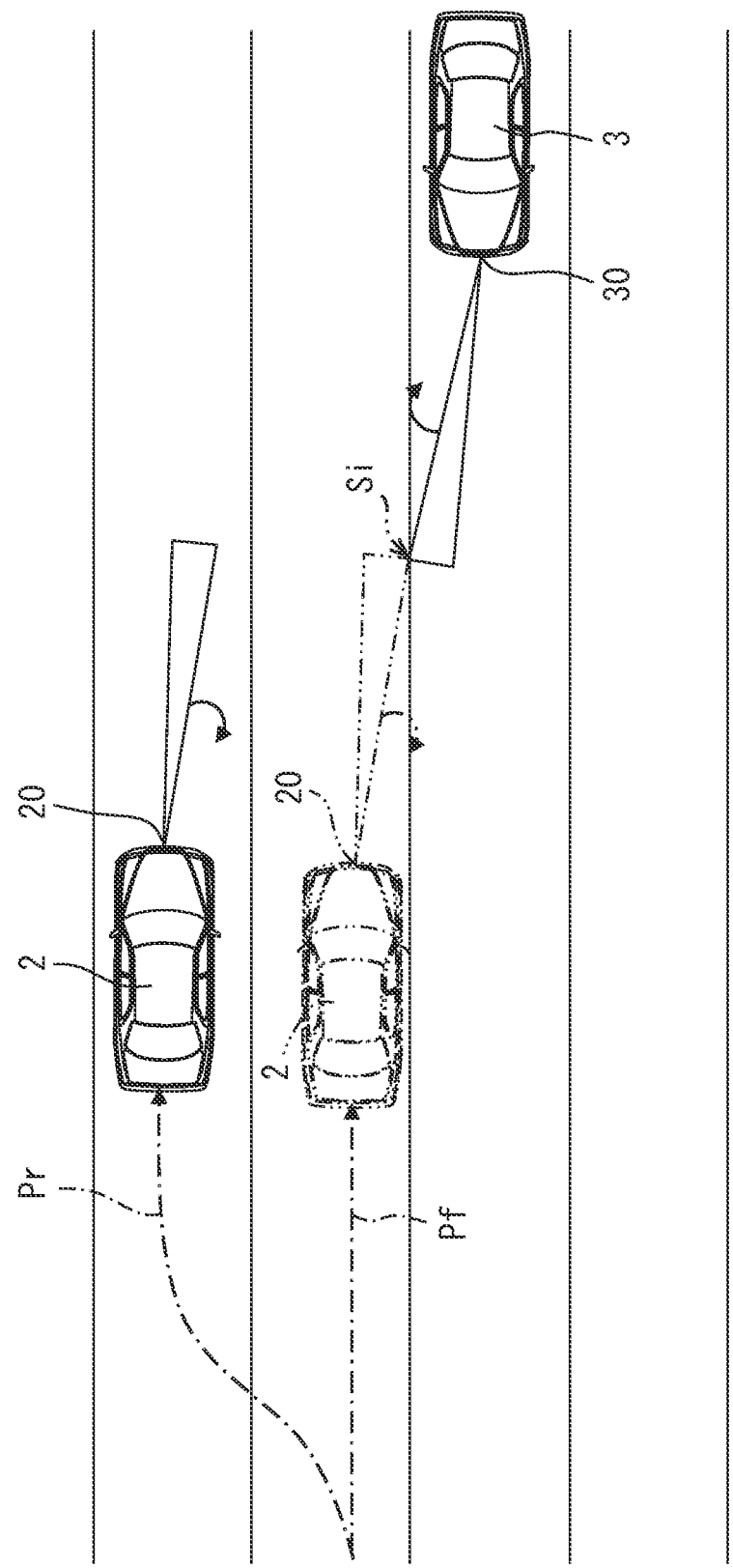
FIG. 9 is a schematic diagram for explaining a path change control according to the first embodiment.
Figure 10:
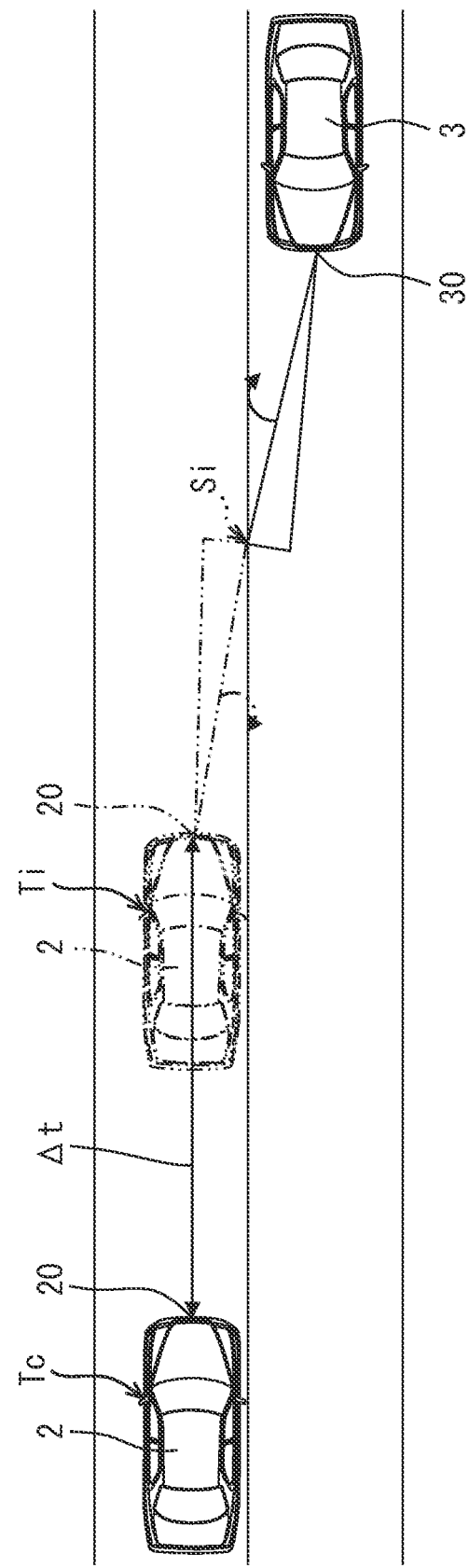
FIG. 10 is a schematic diagram showing a beam change control according to the first embodiment.
Figure 11:
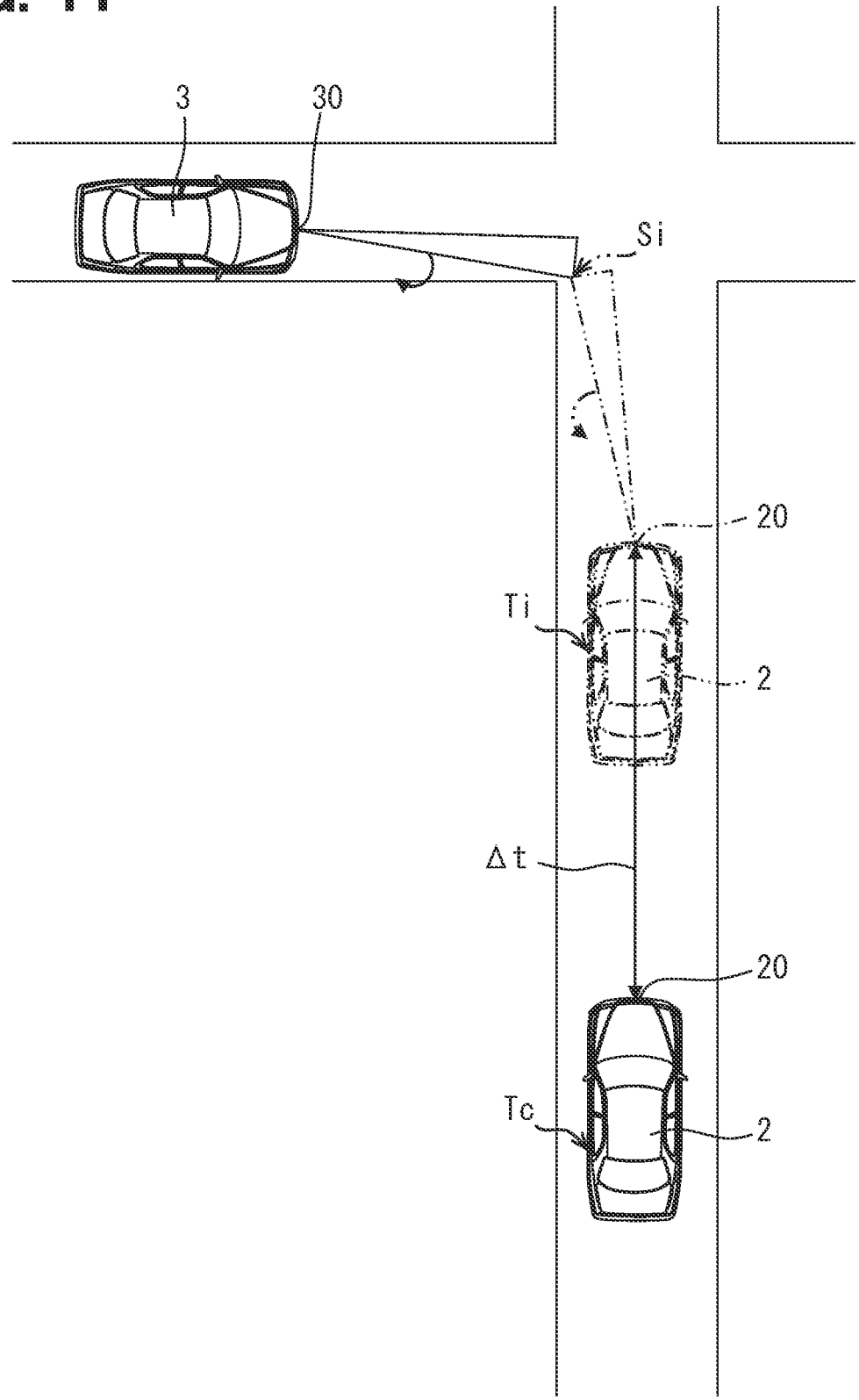
FIG. 11 is a schematic diagram showing a beam change control according to the first embodiment.

FIG. 5, FIG. 9, FIG. 10, and FIG. 12 each shows an interference scene Si in a case where the host vehicle 2 and the target vehicle 3 travel on opposite lanes in opposite traveling directions. Details of FIG. 9, FIG. 10, and FIG. 12 will be described later. FIG. 6 shows an interference scene Si when the host vehicle 2 and the target vehicle 3 travel in parallel lanes in the same traveling direction. FIG. 7 and FIG. 11, which will be described later, each shows an interference scene Si in a case where the host vehicle 2 and the target vehicle 3 travel in intersecting lanes in traveling directions intersecting with one another.

As shown in FIG. 4, in S102, when the interference scene Si is not predicted by the interference prediction block 110, the current execution of the control flow is ended. A plan of the future path Pf in each of the host vehicle 2 and the target 3 is finite, it is possible that the interference scene Si may be not predicted. In S102, when the interference scene Si is predicted by the interference prediction block 110, the control flow proceeds to S103.

Figure 8:
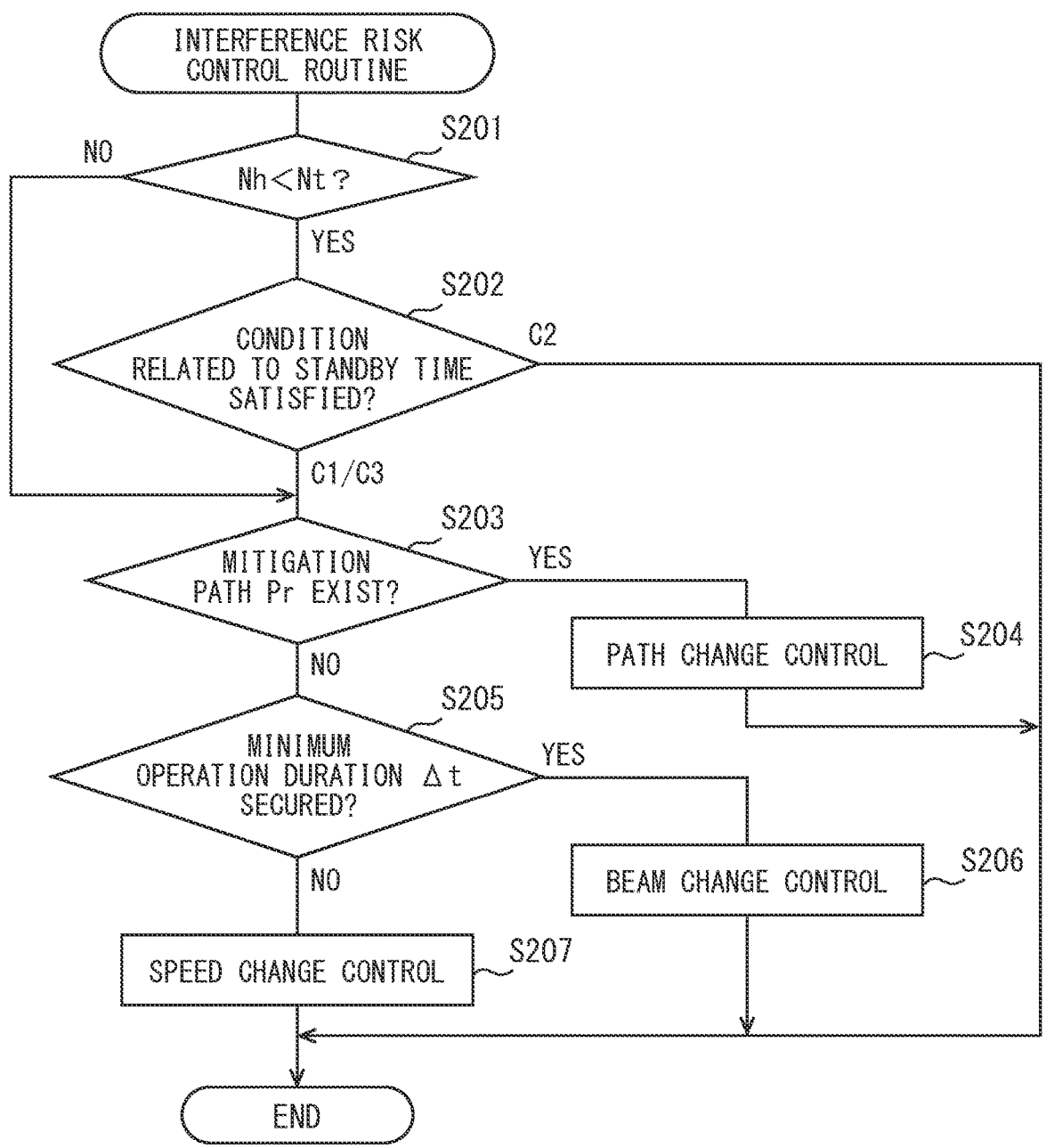
FIG. 8 is a flowchart showing an interference risk control routine according to the first embodiment.

In S103, the vehicle control block 120 performs, to the host vehicle 2, an interference risk control for mitigating the risk of beam interference in the interference scene Si predicted by the interference prediction block 110 in S102. In S103, the vehicle control block 120 executes an interference risk control routine as shown in FIG. 8.

In S201 of the interference risk control routine according to the first embodiment, the vehicle control block 120 compares the number of changeable paths Nh to which the currently selected future path Pf can be changed by the host vehicle 2 with the number of changeable paths Nt to which the currently selected future path Pf can be changed by the target vehicle 3. At this time, the changeable path numbers Nh and Nt are recognized based on the irradiation related information Ii acquired by the information acquisition block 100 in S101. As a comparing result, when the number of changeable paths Nh of the host vehicle 2 is smaller than the number of changeable paths Nt of the target vehicle 3, the interference risk control routine proceeds to S202.

In S202, the vehicle control block 120 maintains the control of host vehicle 2 in accordance with the future path Pf during a standby time for waiting for a response notification from the target vehicle 3 through the communication system 5. In S202, when a condition C1 that the response notification from the target vehicle 3 cannot be acquired within the standby time is satisfied, the interference risk control routine proceeds to S203.

In S202, when a condition C2 that the response notification is acquired from the target vehicle 3 within the standby time is satisfied and the notification indicates a control of the target vehicle 3 is optimal for the risk mitigation of the beam interference, the current execution of the interference risk control routine of the control flow is ended. In S202, when a condition C3 that the response notification is acquired from the target vehicle 3 within the standby time is satisfied and the notification indicates a control of the target vehicle 3 is insufficient for the risk mitigation of the beam interference, the interference risk control routine proceeds to S203. Whether the control notified from the target vehicle 3 as a response is optimal for the risk mitigation is determined according to whether the prediction of interference scene Si predicted by the interference prediction block 110 can be eliminated by the control.

In S203 of the interference risk control routine, as shown in FIG. 9, the vehicle control block 120 determines whether a mitigation path Pr, which is optimal for mitigating the risk of beam interference, exists or not. The mitigation path Pr is a path to which the future path Pf of the host vehicle 2 can be changed to. At this time, whether the path after change is optimal for risk mitigation is determined according to whether the prediction of the interference scene Si by the interference prediction block 110 is eliminated by the path after change.

When the mitigation path Pr is determined to exist in S203, the interference risk control routine proceeds to S204 as shown in FIG. 8. In S204, the vehicle control block 120 provides the host vehicle 2 with path change control (see FIG. 9) for changing the future path Pf to the mitigation path Pr. That is, in S204, the vehicle control block 120 executes the path change control for eliminating the prediction of interference scene Si on the host vehicle 2. At this time, the vehicle control block 120 may transmit a response notification indicating execution of the path change control to the target vehicle 3 through the communication system 5. Upon completion of S204, the current execution of the interference risk control routine of the control flow is ended.

When the path change control in S204 is prohibited because the mitigation path Pr is determined to not exist in S203, the interference risk control routine proceeds to S205. At this time, the vehicle control block 120 may transmit a response notification indicating prohibition of the path change control to the target vehicle 3 through the communication system 5.

In S205, the vehicle control block 120 determines whether the minimum operation duration Δt, which is necessary for changing the current scheduled pattern of beam irradiation to a mitigation pattern optimal for mitigating the risk of beam interference, can be secured in the host vehicle 2. At this time, the minimum operation duration Δt shown in FIG. 10 and FIG. 11 is included in the path information Ip of the irradiation related information Ii acquired by the information acquisition block 100 in S101. Therefore, whether the minimum operation duration Δt can be secured may be determined by determining whether a length of time from a current time to the start time Ti of interference scene Si predicted by the interference prediction block 110 in S102 is equal to or greater than a length of the minimum operation duration Δt.

When the minimum operation duration Δt can be secured in S205, the interference risk control routine proceeds to S206 as shown in FIG. 8. In S206, the vehicle control block 120 performs, to the host vehicle 2, a beam change control for changing the scheduled beam irradiation pattern to the mitigation pattern. That is, in S206, the vehicle control block 120 executes the beam change control for eliminating the prediction of interference scene Si on the host vehicle 2. At this time, as shown in FIG. 10 and FIG. 11, the vehicle control block 120 sets the start time Tc of the beam change control by going back a duration equal to or longer than the secured minimum operation duration Δt from the start time Ti of the interference scene Si predicted by the interference prediction block 110 in S102.

In S206 of FIG. 8, after the set start time Tc, the vehicle control block 120 may execute, as the beam change control, temporary stop of the beam irradiation by changing the intermittent irradiation timing in the interfering irradiation azimuth, increase or decrease of the scanning angular velocity of irradiation scanning azimuth, or the like. The two-dot chain lines in FIG. 10 and FIG. 11 each indicates an example of the temporary stop state. At this time, the vehicle control block 120 may transmit a response notification indicating execution of the beam change control to the target vehicle 3 through the communication system 5. Upon completion of S206, the current execution of the interference risk control routine of the control flow is ended.

When it is determined, in S205, that the minimum operation duration Δt cannot be secured, not only the path change control in S204 but also the beam change control in S206 is also prohibited. Then, the interference risk control routine proceeds to S207. At this time, the vehicle control block 120 may transmit a response notification indicating prohibition of the beam change control to the target vehicle 3 through the communication system 5.

Figure 12:
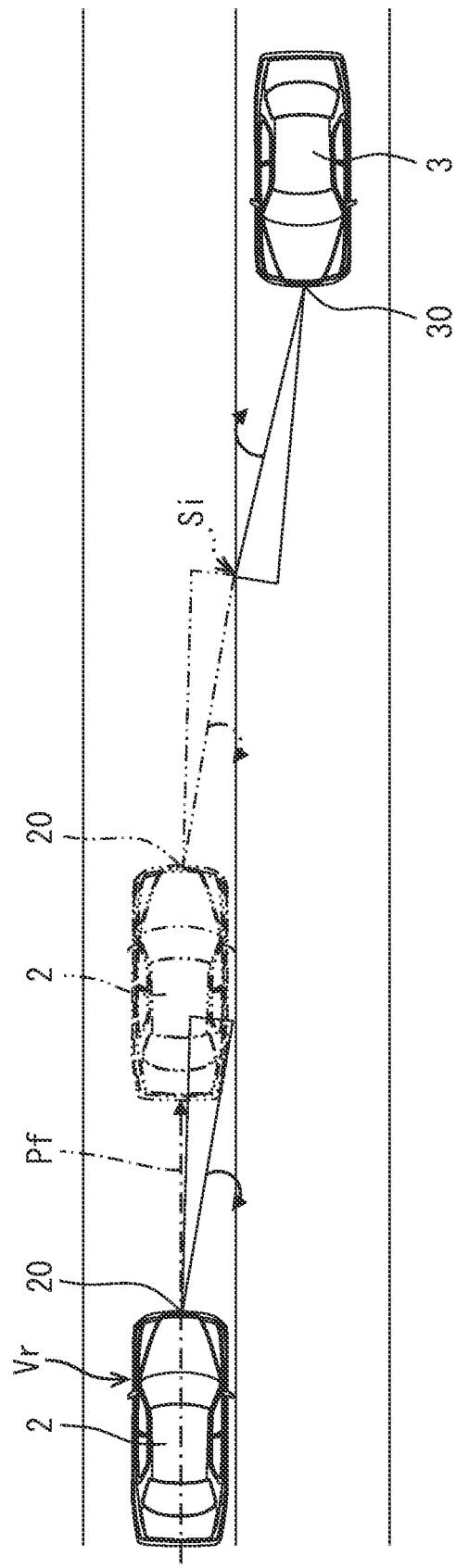
FIG. 12 is a schematic diagram for explaining a speed change control according to the first embodiment.

In S207, the vehicle control block 120 performs, to the host vehicle 2, a speed change control for changing a traveling speed to a mitigation speed Vr as shown in FIG. 12. That is, in S207, the vehicle control block 120 executes the speed change control for eliminating the prediction of interference scene Si on the host vehicle 2. At this time, the vehicle control block 120 sets the mitigation speed Vr, which is decreased or increased from the current traveling speed of the host vehicle 2, based on a speed profile or an acceleration profile of the future path Pf acquired by the information acquisition block 100 in S101. The mitigation speed Vr may be preferably set by deceleration of the vehicle speed. At this time, the vehicle control block 120 may transmit a response notification indicating execution of the speed change control to the target vehicle 3 through the communication system 5. Upon completion of S207, the current execution of the interference risk control routine of the control flow is ended.

The above process is executed under a condition that the number of changeable paths Nh of the host vehicle 2 is determined to be smaller than the number of changeable paths Nt of the target vehicle 3 in S201 of FIG. 8. The following will describe a case where the number of changeable paths Nh of the host vehicle 2 is equal to or greater than the number of changeable paths Nt of the target vehicle 3. In this case, the interference risk control routine proceeds to S203, and then S203 to 207 may be properly executed as necessary.

(Operation Effects)

The operation effects of the first embodiment will be described below.

According to the present embodiment, the interference scene Si in which beam interference occurs between the host vehicle 2 and the target vehicle 3 is predicted based on the irradiation related information Ii, which is related to beam irradiation of the host vehicle 2 and the target vehicle 3. In the predicted interference scene Si, by providing the host vehicle 2 with the interference risk control for mitigating the risk of beam interference, beam interference can be avoided in a versatile manner even when the specifications of the beam sensors 20, 30 are different between the host vehicle 2 and the target vehicle 3. Therefore, it is possible to ensure high sensing accuracy in the host vehicle 2. In the first embodiment, the control device 1 mounted on the host vehicle 2 is capable of communicating with the target vehicle 3. Thus, by using the control device 1 of the host vehicle 2, it is possible to ensure the sensing accuracy in the host vehicle 2.

According to the first embodiment, the path change control is executed in the host vehicle 2 as the interference risk control. According to this configuration, even when the specification of the beam sensor 20 mounted in the host vehicle 2 is different from the specification of the beam sensor 30 of the target vehicle 3, the future path Pf in the host vehicle 2 is changed to the mitigation path Pr that mitigates the beam interference risk, and thus it is more likely to avoid the beam interference in the host vehicle. As a result, it is possible to reliably ensure the sensing accuracy in the host vehicle 2.

According to the first embodiment, the beam change control is executed in the host vehicle 2 as the interference risk control. According to this configuration, even when the specification of the beam sensor 20 of the host vehicle 2 is different from the specification of the beam sensor 30 of the target vehicle 3, the scheduled pattern of the beam irradiation in the host vehicle 2 is changed to the mitigation pattern that mitigates the beam interference risk. Thus, it is more likely to avoid the beam interference in the host vehicle. As a result, it is possible to reliably ensure the sensing accuracy in the host vehicle 2.

According to the first embodiment, in the interference scene Si in which the path change control is prohibited, the beam change control is executed in the host vehicle 2 as the interference risk control. Accordingly, in the host vehicle 2, even in a situation where it is difficult to avoid beam interference by the path change control, it is possible to avoid the beam interference by switching to the beam change control. As a result, it is possible to maintain reliability of the sensing accuracy in the host vehicle 2.

According to the first embodiment, the start time Tc of the beam change control is set so as to be earlier than the start time Ti of the predicted interference scene Si by the minimum operation duration Δt or more. The minimum operation duration is a duration necessary for changing the scheduled pattern of beam irradiation in the host vehicle 2. According to this configuration, it is possible to accurately determine the start time Tc of the beam change control and avoid the beam interference with high accuracy. Therefore, a high sensing accuracy can be reliably achieved.

According to the first embodiment, the speed change control is executed in the host vehicle 2 as the interference risk control. According to this configuration, even when the specification of the beam sensor 20 mounted in the host vehicle 2 is different from the specification of the beam sensor 30 of the target vehicle 3, the speed of host vehicle 2 is changed to the mitigation speed Vr that mitigates the beam interference risk, and thus it is more likely to avoid the beam interference in the host vehicle. As a result, it is possible to reliably ensure the sensing accuracy in the host vehicle 2.

According to the first embodiment, in the interference scene Si in which the path change control and the beam change control are prohibited, the speed change control is executed in the host vehicle 2 as the interference risk control. Accordingly, in the host vehicle 2, even in a situation where it is difficult to avoid beam interference by the path change control and in a situation where it is difficult to avoid beam interference by the beam change control, it is possible to avoid the beam interference by switching to the speed change control. As a result, it is possible to ensure high sensing accuracy with high reliability in the host vehicle 2.

Second Embodiment

Figure 13:
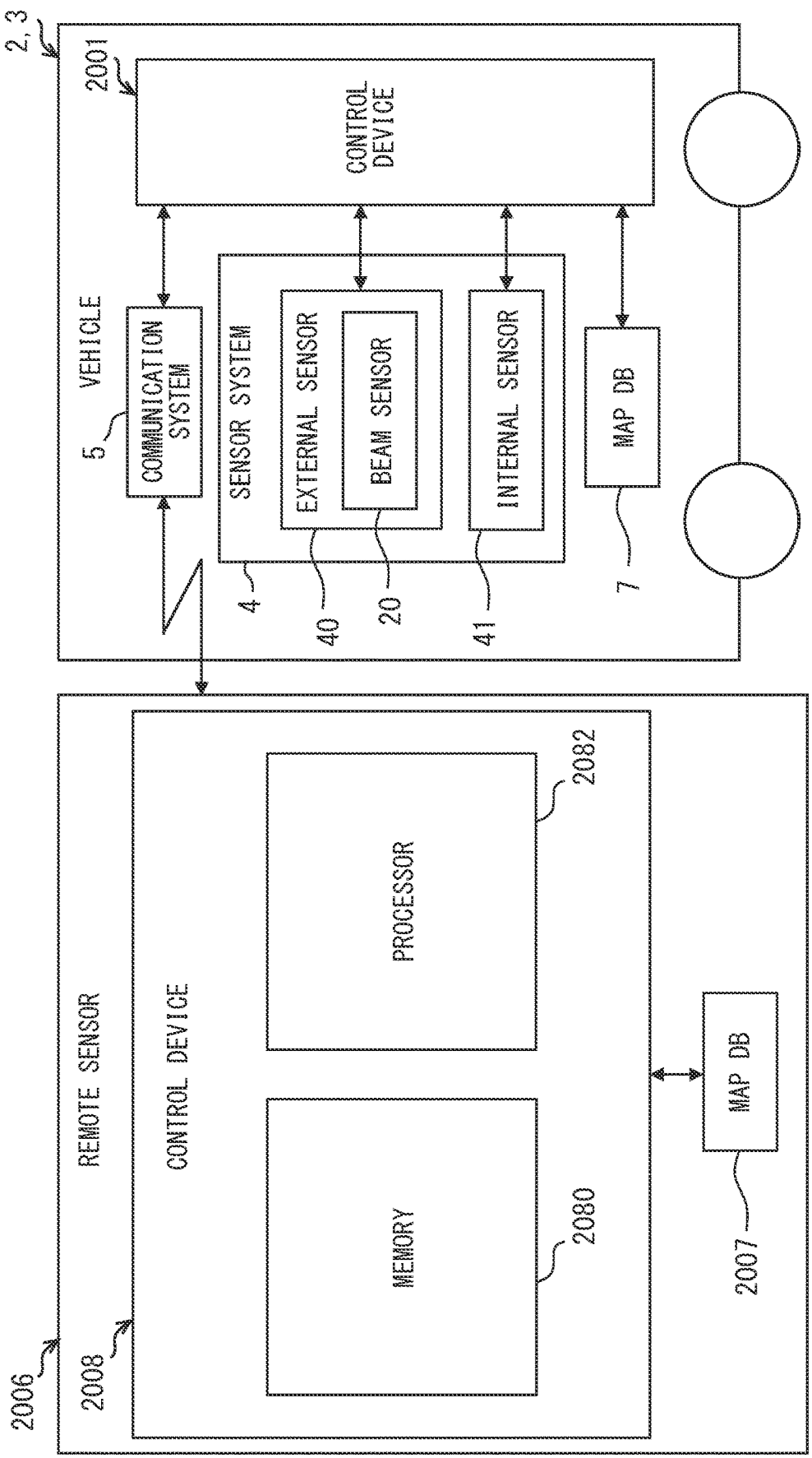
FIG. 13 is a block diagram showing an overall configuration according to a second embodiment.

As shown in FIG. 13, the second embodiment is a modification of the first embodiment.

In the second embodiment, a remote center 2006 identifies the target vehicle 3 from multiple periphery vehicles to which respective beam sensors are mounted. The target vehicle is a vehicle set as a target with respect to the host vehicle 2 to which interference risk control is to be executed by transmitting a command through the communication network. Hereinafter, the multiple periphery vehicle to be monitored are also referred to as monitor target vehicles. The host vehicle 2, which is a command destination of the interference risk control, is changed as necessary. As shown in FIG. 13, the host vehicle 2, which corresponds to one command destination of the interference risk control, is recognized as the target vehicle 3 from a viewpoint of another host vehicle 2, which corresponds to the other command destination of the interference risk control. Further, the communication network established by the monitor target vehicle and the remote center 2006 may be synchronized based on the global clock. The monitor target vehicle, which corresponds to the host vehicle 2, is equipped with a control device 2001 from which the interference risk control function described in the first embodiment is omitted.

The remote center 2006 mainly includes a server unit including a control device 2008, a communication unit, and a map database 2007, and provides interference risk control to the host vehicle 2. The map database 2007 includes a non-transitory tangible storage medium, which is at least one type of a semiconductor memory, a magnetic medium, an optical medium, or the like. The map database 2007 properly updates and stores map information Im to be transmitted to the monitor target vehicle and to be stored in the map database 7 of the monitor target vehicle.

The special purpose computer included in the control device 2008 may include at least one memory 2080 and at least one processor 2082. The memory 2080 and the processor 2082 of the control device 2008 are configured similar to the memory 10 and the processor 12 of the control device 1 described in the first embodiment.

Figure 14:
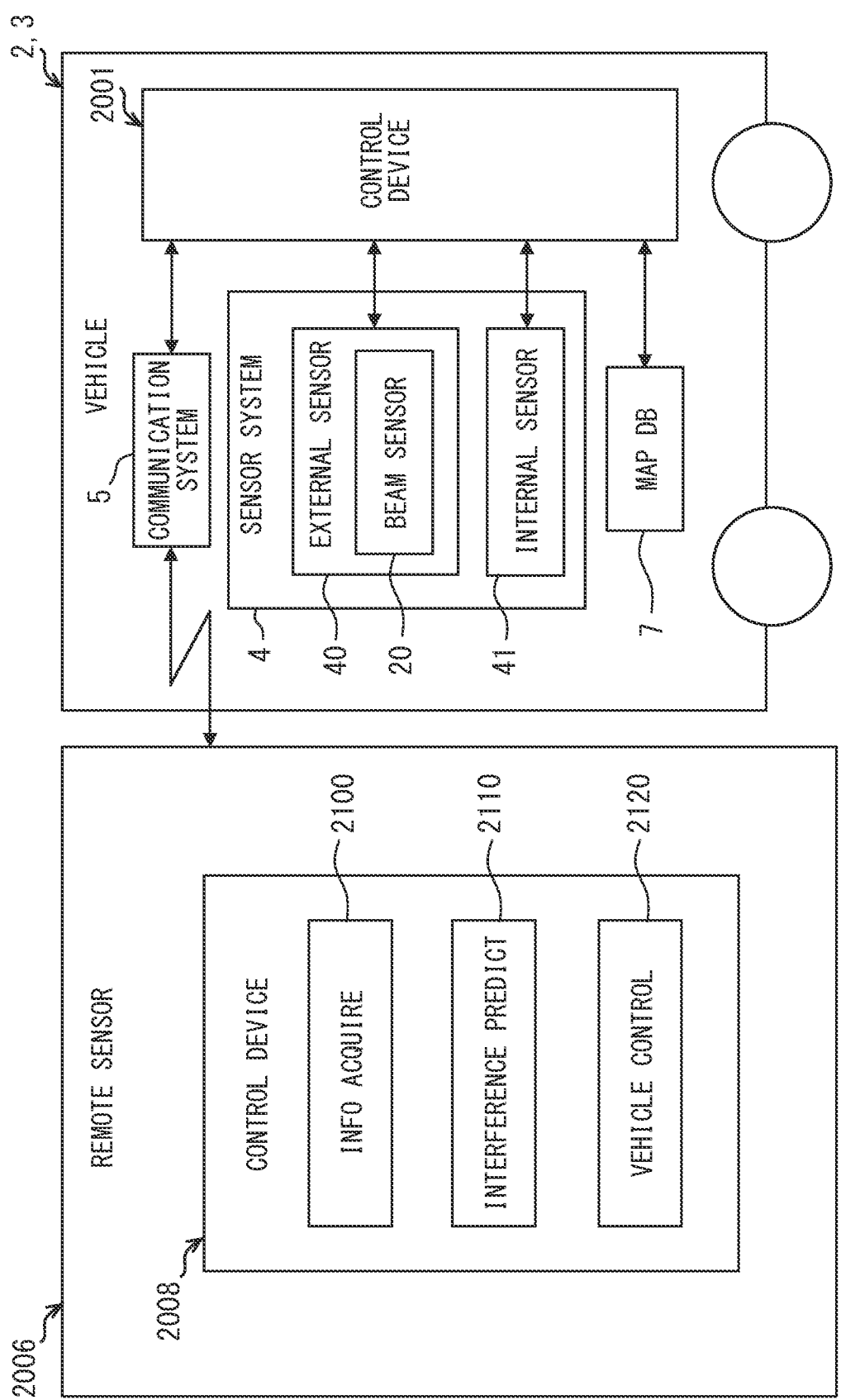
FIG. 14 is a block diagram showing a functional configuration of a control device according to the second embodiment.

In the control device 2008, the processor 2082 executes instructions included in the control program stored in the memory 2080 in order to avoid beam interference between the beam sensor 30 of the monitor target vehicle, which corresponds to the target vehicle 3, between the beam sensor 20 of the monitor target vehicle, which corresponds to the host vehicle 2. Accordingly, the control device 2008 constructs multiple functional blocks in order to avoid beam interference between the beam sensor 30 of the monitor target vehicle, which corresponds to the target vehicle 3, and the beam sensor 20 of the monitor target vehicle, which corresponds to the host vehicle 2. As shown in FIG. 14, the functional blocks of the control device 2008 include an information acquisition block 2100, an interference prediction block 2110, and a vehicle control block 2120.

Figure 15:
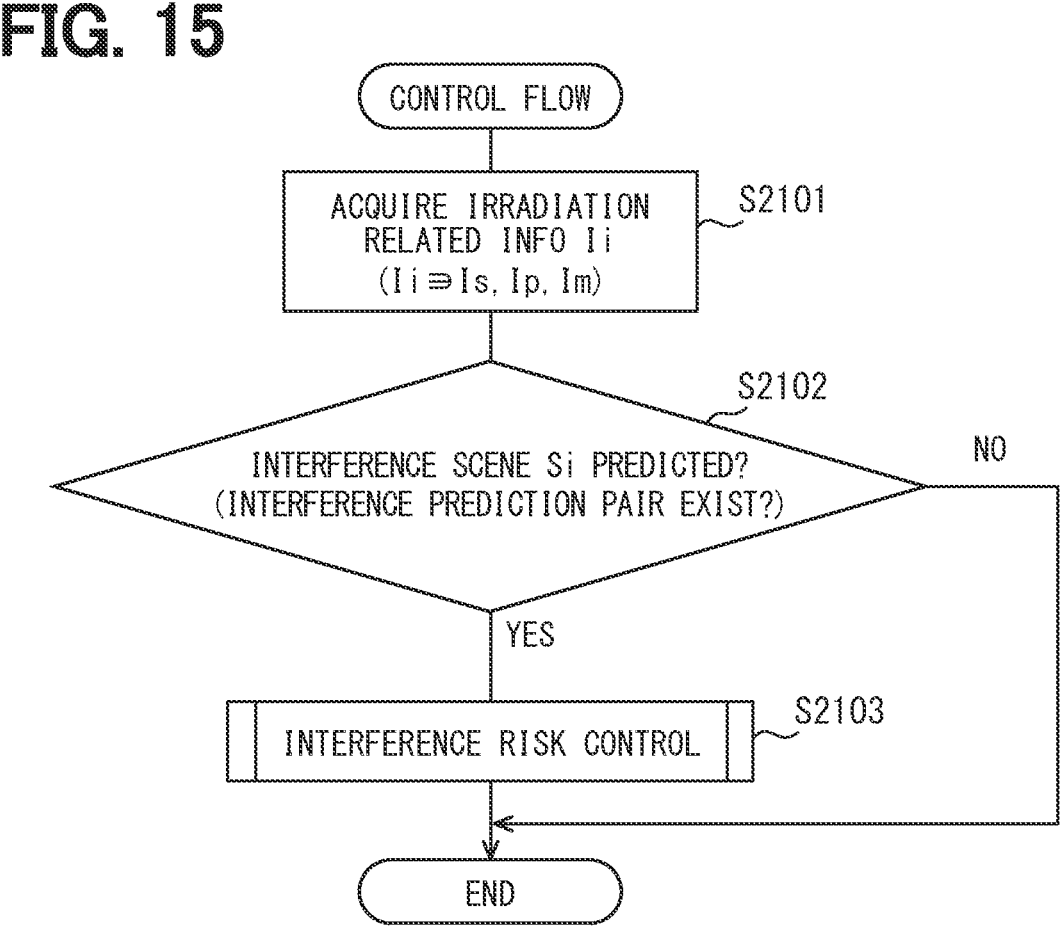
FIG. 15 is a flowchart showing a control method according to the second embodiment.

A control method for avoiding beam interference between the beam sensor 30 of the monitor target vehicle, which corresponds to the target vehicle 3, and the beam sensor 20 of the monitor target vehicle, which corresponds to the host vehicle 2, is executed by the control device 2008 in cooperation with the functional blocks 2100,2110, and 2120, according to a control flow shown in FIG. 15. The control flow is repeatedly executed during activated state of the remote center 2006.

In the second embodiment, in S2101 of the control flow, the information acquisition block 2100 acquires irradiation related information Ii related to beam irradiation in each monitor target vehicle. At this time, the irradiation related information Ii is acquired through a communication network with the communication system 5 of each monitor target vehicle and through the map database 2007 of the remote center 2006. Each acquired irradiation related information Ii includes the characteristic information Is, the path information Ip, and the map information Im similar to the first embodiment.

In S2102 of the control flow, the interference prediction block 2110 predicts an interference scene Si in which beam interference occurs between the monitoring target vehicles based on each irradiation related information Ii acquired by the information acquisition block 2100 in S2101. The definition of the interference scene Si predicted at this time is similar to the interference scene described in the first embodiment. When the interference scene Si is predicted, the information acquisition block 2100 may accumulate the irradiation related information Ii at least at the prediction time among the prediction time and the time before or after the prediction time in the memory 2080 in association with a time stamp.

In S2102, the interference prediction block 2110 monitors whether a pair of monitor target vehicles for which occurrence of the interference scene Si is predicted exists. Hereinafter, the pair of monitor target vehicles for which occurrence of the interference scene is predicted is referred to as an interference prediction pair. The information acquisition block 2100 may superimpose the information to be displayed to the operator, which includes the characteristic information Is and the path information Ip, on the map information Im, and display the characteristic information Is and the path information Ip on the map information Im to the operator. Then, the information acquisition block may determine whether the interference scene Si has occurred in accordance with an instruction input by the operator.

In S2102, when the interference scene Si is not predicted by the interference prediction block 2110, the current execution of the control flow is ended. Since a plan of the future path Pf in each monitor target vehicle is finite, it is possible that the interference scene Si may be not predicted. In S2102, when the interference scene Si is predicted by the interference prediction block 2110, the control flow proceeds to S2103.

Figure 16:
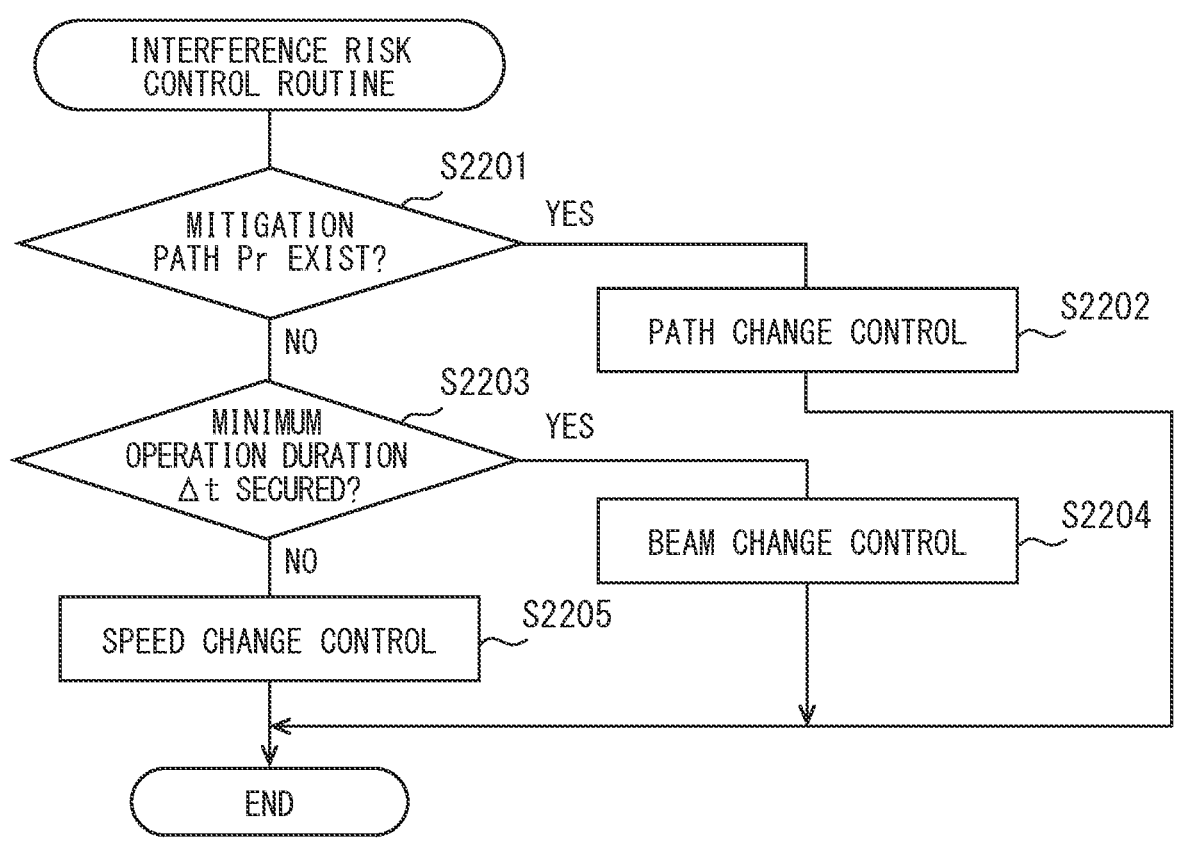
FIG. 16 is a flowchart showing an interference risk control routine according to the second embodiment.

In S2103, the vehicle control block 2120 executes the interference risk control to at least one monitor target vehicle, which corresponds to the host vehicle 2, among the vehicles included in the interference prediction pair in the interference scene Si predicted by the interference prediction block 110 in S2102. In S2103, the vehicle control block 2120 executes an interference risk control routine as shown in FIG. 16.

In S2201 of the interference risk control routine according to the second embodiment, the vehicle control block 2120 determines, for at least one monitor target vehicle, which corresponds to the host vehicle 2 in the interference prediction pair, whether there exists a mitigation path Pr, to which the future path Pf of the at least one monitor target vehicle can be changed. At this time, the monitor target vehicle, which corresponds to the host vehicle 2 in the interference prediction pair, may be one monitor target vehicle that has greater number of mitigation paths Pr or may be both of the monitor target vehicles.

When the mitigation path Pr is determined to exist in S2201, the interference risk control routine proceeds to S2202. In S2202, the vehicle control block 2120 executes the path change control to the mitigation path Pr similar to the first embodiment by transmitting a communication command to at least one monitor target vehicle as the host vehicle 2. Upon completion of S2202, the current execution of the interference risk control routine of the control flow is ended.

When the path change control in S2202 is prohibited because the mitigation path Pr is determined to not exist in S2201, the interference risk control routine proceeds to S2203. In S2203, the vehicle control block 2120 determines whether the minimum operation duration Δt necessary for changing the scheduled beam irradiation pattern to the mitigation pattern can be secured in at least one monitor target vehicle, which corresponds to the host vehicle 2 in the interference prediction pair. At this time, the monitor target vehicle, which corresponds to the host vehicle 2 in the interference prediction pair, may be one monitor target vehicle that has shorter minimum operation duration Δt or may be both of the monitor target vehicles. In any of these cases, the determination that determines whether the minimum operation duration can be secured may be executed similar to the first embodiment for each monitor target vehicle included in the interference prediction pair.

When the minimum operation duration Δt is determined to be secured in S2203, the interference risk control routine proceeds to S2204. In S2204, the vehicle control block 2120 executes the beam change control to the mitigation pattern similar to the first embodiment by transmitting a communication command to at least one monitor target vehicle as the host vehicle 2. Upon completion of S2204, the current execution of the interference risk control routine of the control flow is ended.

When it is determined, in S2203 that the minimum operation duration Δt cannot be secured, not only the path change control in S2202 but also the beam change control in S2204 is also prohibited. Then, the interference risk control routine proceeds to S2205. In S2205, the vehicle control block 2120 executes the speed change control to the mitigation speed Vr similar to the first embodiment by transmitting a communication command to at least one monitor target vehicle as the host vehicle 2. At this time, the monitor target vehicle, which corresponds to the host vehicle 2 in the interference prediction pair, may be one monitor target vehicle that has smaller speed change amount to the mitigation speed Vr or may be both of the monitor target vehicles. Upon completion of S2205, the current execution of the interference risk control routine of the control flow is ended.

As described above, in the second embodiment, by using the control device 2008 that constructs the remote center 2006 capable of communicating with the host vehicle 2 and the target vehicle 3, it is possible to ensure the sensing accuracy by the same principle as in the first embodiment.

OTHER EMBODIMENTS

Although multiple embodiments have been described above, the present disclosure is not to be construed as being restricted to these embodiments, and can be applied to various embodiments and combinations without departing from the spirit of the present disclosure.

The dedicated computer constituting each of the control device 1 and the control device 2008 may include at least one of a digital circuit or an analog circuit as a processor. The digital circuit is at least one type of, for example, an application specific integrated circuit (ASIC), a field programmable gate array (FPGA), a system on a chip (SOC), a programmable gate array (PGA), a complex programmable logic device (CPLD), and the like. Such a digital circuit may include a memory in which a program is stored.

The path change control in S204 and S2202, the beam change control in S206 and S2204, and the speed change control in S207 and S2205 may have different priorities (order of execution) from the order described in the first and second embodiments by properly changing the determination conditions in S203, S205, S2201, and S2203. In a modification where the speed change control is preferentially (at an early stage) executed than at least one of the path change control or the beam change control, for example, whether or not the speed change control is possible may be adopted as the determination condition.

In the modification, one or two of (i) the path change control in S204 and S2202, (ii) the beam change control in S206 and S2204, or (iii) the speed change control in S207 and S2205 may be omitted. In addition to the embodiments described above, the first and second embodiments and the modification example may be implemented as a semiconductor device (for example, a semiconductor chip or the like) including at least one processor 12, 2082 and one memory 10, 2080 of each of the control device 1, 2008.

What is claimed is:

1. A control device avoiding a beam interference between a beam sensor of a host vehicle and a beam sensor of a target vehicle,
   the control device comprising a processor,
   wherein the processor:
      acquires irradiation related information related to beam irradiation of the host vehicle and the target vehicle;
      predicts, based on the irradiation related information, an interference scene in which the beam interference occurs between the host vehicle and the target vehicle; and
      performs an interference risk control to the host vehicle to mitigate a risk of beam interference in the predicted interference scene,
   wherein performing the interference risk control includes:
      performing a path change control to the host vehicle to change a future path of the host vehicle to a mitigation path that mitigates the risk of beam interference; and
      performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

2. The control device according to claim 1, wherein performing the interference risk control includes setting a start time of the beam change control to be earlier than a predicted start time of the interference scene by at least a minimum operation duration, and
   the minimum operation duration is a duration required for changing the scheduled pattern of beam irradiation in the host vehicle.

3. The control device according to claim 1, wherein performing the interference risk control includes performing a speed change control to the host vehicle to change a traveling speed of the host vehicle to a mitigation speed that mitigates the beam interference.

4. The control device according to claim 1, wherein performing the interference risk control includes performing a speed change control to the host vehicle to change a traveling speed of the host vehicle to a mitigation speed that mitigates the beam interference in the interference scene where the path change control and the beam change control are prohibited.

5. The control device according to claim 1, wherein the control device is mounted on the host vehicle, and the host vehicle is capable of communicating with the target vehicle.

6. The control device according to claim 1, wherein the control device configures a remote center, which is capable of communicating with the host vehicle and the target vehicle.

7. A control method executed by a processor to avoid a beam interference between a beam sensor of a host vehicle and a beam sensor of a target vehicle, the control method comprising:
   acquiring irradiation related information related to beam irradiation of the host vehicle and the target vehicle;
   predicting, based on the irradiation related information, an interference scene in which the beam interference occurs between the host vehicle and the target vehicle; and
   performing an interference risk control to the host vehicle to mitigate a risk of beam interference in the predicted interference scene,
   wherein performing the interference risk control includes:
      performing a path change control to the host vehicle to change a future path of the host vehicle to a mitigation path that mitigates the risk of beam interference; and
      performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

8. A computer-readable non-transitory storage medium storing a control program, the control program comprising instructions to be executed by a processor to avoid a beam interference between a beam sensor of a host vehicle and a beam sensor of a target vehicle, the instructions comprising:
   acquiring irradiation related information related to beam irradiation of the host vehicle and the target vehicle;
   predicting, based on the irradiation related information, an interference scene in which the beam interference occurs between the host vehicle and the target vehicle; and
   performing an interference risk control to the host vehicle to mitigate a risk of beam interference in the predicted interference scene,
   wherein performing the interference risk control includes:
      performing a path change control to the host vehicle to change a future path of the host vehicle to a mitigation path that mitigates the risk of beam interference; and
      performing a beam change control to the host vehicle to change a scheduled pattern of beam irradiation in which irradiation timing is set to be intermittent and an irradiation azimuth is set in scan manner to a mitigation pattern that mitigates the beam interference in response to the path change control being determined to be prohibited.

* * * * *